(12) United States Patent
Kumano et al.

(10) Patent No.: US 11,378,943 B2
(45) Date of Patent: Jul. 5, 2022

(54) INFORMATION PROCESSING DEVICE, INFORMATION PROCESSING METHOD, AND PROGRAM

(71) Applicants: MITSUBISHI HEAVY INDUSTRIES, LTD., Tokyo (JP); Mitsubishi Hitachi Power Systems, Ltd., Yokohama (JP)

(72) Inventors: Shintaro Kumano, Tokyo (JP); Makoto Kishi, Tokyo (JP); Keisuke Yamamoto, Tokyo (JP); Katsuhiko Abe, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 451 days.

(21) Appl. No.: 16/496,604

(22) PCT Filed: Mar. 26, 2018

(86) PCT No.: PCT/JP2018/012014
§ 371 (c)(1),
(2) Date: Sep. 23, 2019

(87) PCT Pub. No.: WO2018/181116
PCT Pub. Date: Oct. 4, 2018

(65) Prior Publication Data
US 2021/0109511 A1    Apr. 15, 2021

(30) Foreign Application Priority Data
Mar. 29, 2017   (JP) .............................. JP2017-065993

(51) Int. Cl.
*G05B 19/41*     (2006.01)
*G06F 30/15*     (2020.01)
(Continued)

(52) U.S. Cl.
CPC ... *G05B 19/41885* (2013.01); *G05B 19/4183* (2013.01); *G05B 19/41865* (2013.01);
(Continued)

(58) Field of Classification Search
CPC ...... G06F 2119/00; G06F 30/15; G06F 30/17; G06F 30/18; G06F 30/20; G06F 30/32;
(Continued)

(56) References Cited

U.S. PATENT DOCUMENTS 7,366,997 B1 * 4/2008 Rahmat ................... G06F 30/00
716/120
7,529,639 B2 * 5/2009 Rasanen .................. H04W 4/02
702/150

(Continued)

FOREIGN PATENT DOCUMENTS

CN    102137282 A  *  7/2011  ............. H04L 41/06
JP    09330103 A   *  12/1997

(Continued)

OTHER PUBLICATIONS

International Search Report dated May 15, 2018, issued in counterpart Application No. PCT/JP2018/012014 (4 pages).

(Continued)

*Primary Examiner* — Phallaka Kik
(74) *Attorney, Agent, or Firm* — WHDA, LLP

(57) ABSTRACT

In an information processing device according to the present invention, a statistics estimation unit estimates a value of a state quantity by using a statistical model constructed based on values of past state quantities of a target device. A physical estimation unit estimates a value of a state quantity by using a physical model constructed based on design data of the target device. A specification unit specifies a value to be used to manage the target device from the value estimated by the statistics estimation unit and the value estimated by (Continued)

the physical estimation unit based on deterioration of the target device with time.

8 Claims, 5 Drawing Sheets

(51) Int. Cl.
*G06F 30/17* (2020.01)
*G06F 30/18* (2020.01)
*G06F 30/20* (2020.01)
*G06F 30/32* (2020.01)
*G06F 30/34* (2020.01)
*G05B 19/418* (2006.01)
*G06F 119/00* (2020.01)

(52) U.S. Cl.
CPC .............. *G05B 2219/24075* (2013.01); *G05B 2219/32371* (2013.01); *G05B 2219/37252* (2013.01); *G06F 30/15* (2020.01); *G06F 30/17* (2020.01); *G06F 30/18* (2020.01); *G06F 30/20* (2020.01); *G06F 30/32* (2020.01); *G06F 30/34* (2020.01); *G06F 2119/00* (2020.01)

(58) Field of Classification Search
CPC .............. G06F 30/34; G05B 19/41885; G05B 19/4183; G05B 2219/24075; G05B 2219/32371; G05B 2219/37252
USPC .......... 702/127, 119, 85; 703/4, 5, 6, 20, 14; 716/136, 132, 106, 111
See application file for complete search history.

(56) References Cited

U.S. PATENT DOCUMENTS

| | | | |
|---|---|---|---|
| 10,719,577 B2* | 7/2020 | Natsumeda | G01D 9/005 |
| 11,003,518 B2* | 5/2021 | Lopez | G06F 11/008 |
| 2004/0043758 A1* | 3/2004 | Sorvari | H04W 4/00 |
| | | | 455/414.1 |
| 2011/0251796 A1* | 10/2011 | Waid | E21B 49/008 |
| | | | 702/11 |
| 2012/0078678 A1* | 3/2012 | Pradhan | G06Q 10/0633 |
| | | | 705/7.27 |
| 2014/0149092 A1* | 5/2014 | Nadobny | A61K 41/0052 |
| | | | 703/2 |
| 2016/0004794 A1 | 1/2016 | Reimann et al. | |
| 2018/0031587 A1* | 2/2018 | Bierweiler | G01N 35/00693 |
| 2020/0026590 A1* | 1/2020 | Lopez | G05B 23/0243 |

FOREIGN PATENT DOCUMENTS

| | | | | |
|---|---|---|---|---|
| JP | 2001082782 A | * | 3/2001 | ......... G05B 19/4065 |
| JP | 2003-114294 A | | 4/2003 | |
| JP | 2005-309616 A | | 11/2005 | |
| JP | 2009-053938 A | | 3/2009 | |
| WO | WO-2016088362 A1 | * | 6/2016 | .............. G01D 9/00 |

OTHER PUBLICATIONS

Written Opinion dated May 15, 2018, issued in counterpart Application No. PCT/JP2018/012014, with English Translation (9 pages).

* cited by examiner

US 11,378,943 B2

INFORMATION PROCESSING DEVICE, INFORMATION PROCESSING METHOD, AND PROGRAM

TECHNICAL FIELD

The present invention relates to an information processing device, an information processing method, and a program.

The application is based on Japanese Patent Application No. 2017-065993 filed on Mar. 29, 2017, the content of which is incorporated herein by reference.

BACKGROUND OF THE INVENTION

In a plant such as a power generation plant, it is conceivable that a monitoring device collect state quantities of a target device constituting the plant such as a temperature and a pressure at the time of the operation of the target device, and the collected state quantities be used to execute maintenance, monitoring, and the like of the device.

It has been proposed that the monitoring device process the collected operation data such that an operator of the device can easily use them and execute the maintenance, monitoring, and the like of the device. For example, in Patent Document 1, it is proposed that, when a computer detects omission portions of collected operation data of an industrial plant, the computer execute a complementary process and calculate values of omission state quantities.

In addition, it is known that models such as a physical model and a statistical model are used when values of omission state quantities are set through a complementary process.

DOCUMENTS OF RELATED ART

Patent Documents

Patent Document 1: United States Patent Application, Publication No. 2016/0004794

SUMMARY OF THE INVENTION

Problems to be Solved by the Invention

Patent Document 1 discloses that an information processing device executes a complementary process to complement a value of an omission state quantity, but does not disclose a specific method of setting a value of an omission state quantity.

Each of models used in a complementary process has adaptation conditions that are set based on an operation state of a target device, and the like, and a value of estimation data having higher accuracy is calculated as the degree of conformity with the adaptation conditions increases. However, a computer does not process an estimation value of a state quantity in consideration of adaptation conditions of each of the models and does not set the processed value as a value of the state quantity.

The present invention is contrived in view of the above-described problems, and an object thereof is to appropriately specify state quantity values used to manage a target device based on an estimation value of a state quantity calculated using a plurality of models.

Means to Solve the Problems

According to a first aspect of the present invention, an information processing device includes a statistics estimation unit configured to estimate a value of a state quantity by using a statistical model constructed based on values of past state quantities of a target device, a physical estimation unit configured to estimate a value of a state quantity by using a physical model constructed based on design data of the target device, and a specification unit configured to specify a value to be used to manage the target device from the value estimated by the statistics estimation unit and the value estimated by the physical estimation unit based on deterioration of the target device with time.

According to a second aspect of the present invention, in the information processing device according to the first aspect, the specification unit may be configured to specify a value to be used to manage the target device based on the amount of values of the past state quantities used to construct the statistical model.

According to a third aspect of the present invention, in the information processing device according to the first aspect, the specification unit may be configured to specify a value to be used to manage the target device based on predetermined application conditions of the physical model.

According to a fourth aspect of the present invention, in the information processing device according to any one of the first to third aspects, the specification unit may be configured to specify a value to be used to manage the target device based on an operation time of the target device.

According to a fifth aspect of the present invention, the information processing device according to any one of the first to fourth aspects may further include a notification unit configured to issue a notification in a case where a difference between the value estimated by the statistics estimation unit and the value estimated by the physical estimation unit is equal to or greater than a predetermined value.

According to a sixth aspect of the present invention, the information processing device according to any one of the first to fifth aspects may further include a model updating unit configured to update a statistical model based on the values of the past state quantities used to construct the statistical model, in which the specification unit may be configured to specify a value to be used to manage the target device by using the updated statistical model.

According to a seventh aspect of the present invention, in the information processing device according to any one of the first to sixth aspects, the specification unit may be configured to specify a weighted average value of the value estimated by the statistics estimation unit and the value estimated by the physical estimation unit using weights according to deterioration of the target device with time as a value to be used to manage the target device.

According to an eighth aspect of the present invention, an information processing method includes estimating a value of a state quantity by using a statistical model constructed based on values of past state quantities of a target device, estimating a value of a state quantity by using a physical model constructed based on design data of the target device, and specifying a value to be used to manage the target device from the value estimated using the statistical model and the value estimated using the physical model based on deterioration of the target device with time.

According to a ninth aspect of the present invention, a program causes a computer to estimate a value of a state quantity by using a statistical model constructed based on values of past state quantities of a target device, estimate a value of a state quantity by using a physical model constructed based on design data of the target device, and specify a value to be used to manage the target device from the value estimated using the statistical model and the value estimated using the physical model based on deterioration of the target device with time.

Effects of the Invention

According to at least one aspect of the above-described aspects, the information processing device specifies values to be used to manage a target device from an estimation value of a statistical model and an estimation value of a physical model based on deterioration of a target device with time. Thereby, it is possible to appropriately specify a value of a state quantity to be used to manage the target device.

EMBODIMENTS FOR CARRYING OUT THE INVENTION

First Embodiment

Figure 1:
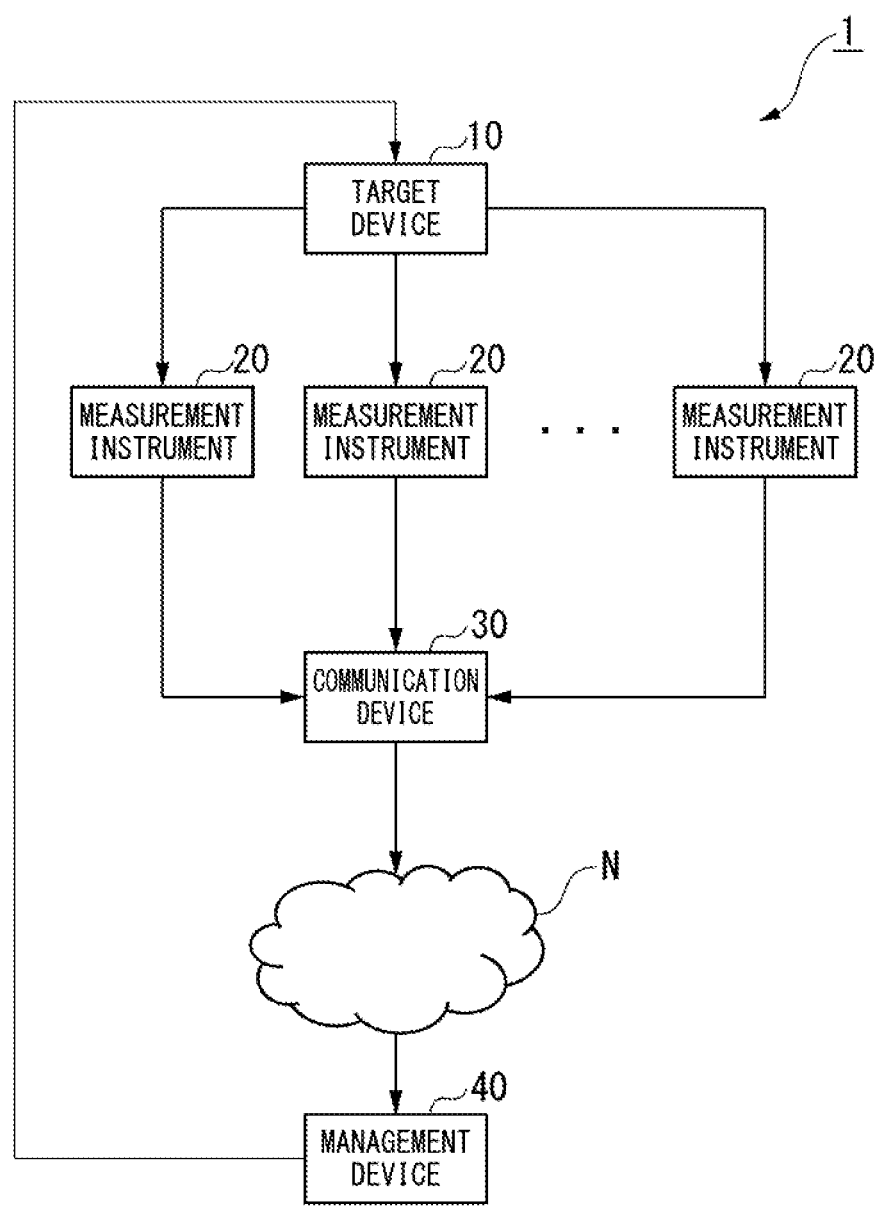
FIG. 1 is a schematic block diagram showing a configuration of a management system according to a first embodiment.

Hereinafter, embodiments will be described in detail with reference to the accompanying drawings.
<Overall Configuration>
FIG. 1 is a schematic block diagram showing a configuration of a management system according to a first embodiment.

A management system 1 includes a target device 10, a plurality of measurement instruments 20, a communication device 30, and a management device 40.

The target device 10 is a device to be managed by the management device 40. Examples of the target device 10 include a gas turbine, a steam turbine, a boiler, a coal gasification furnace, and the like. In addition, the target device may be an environmental plant, a chemical plant, or a transportation system such as an aircraft.

The measurement instrument 20 is provided in the target device 10 and configured to measure a state quantity of the target device 10.

The communication device 30 is configured to transmit a measurement value of the state quantity measured by the measurement instrument 20 to the management device 40 through a network N.

Figure 2:
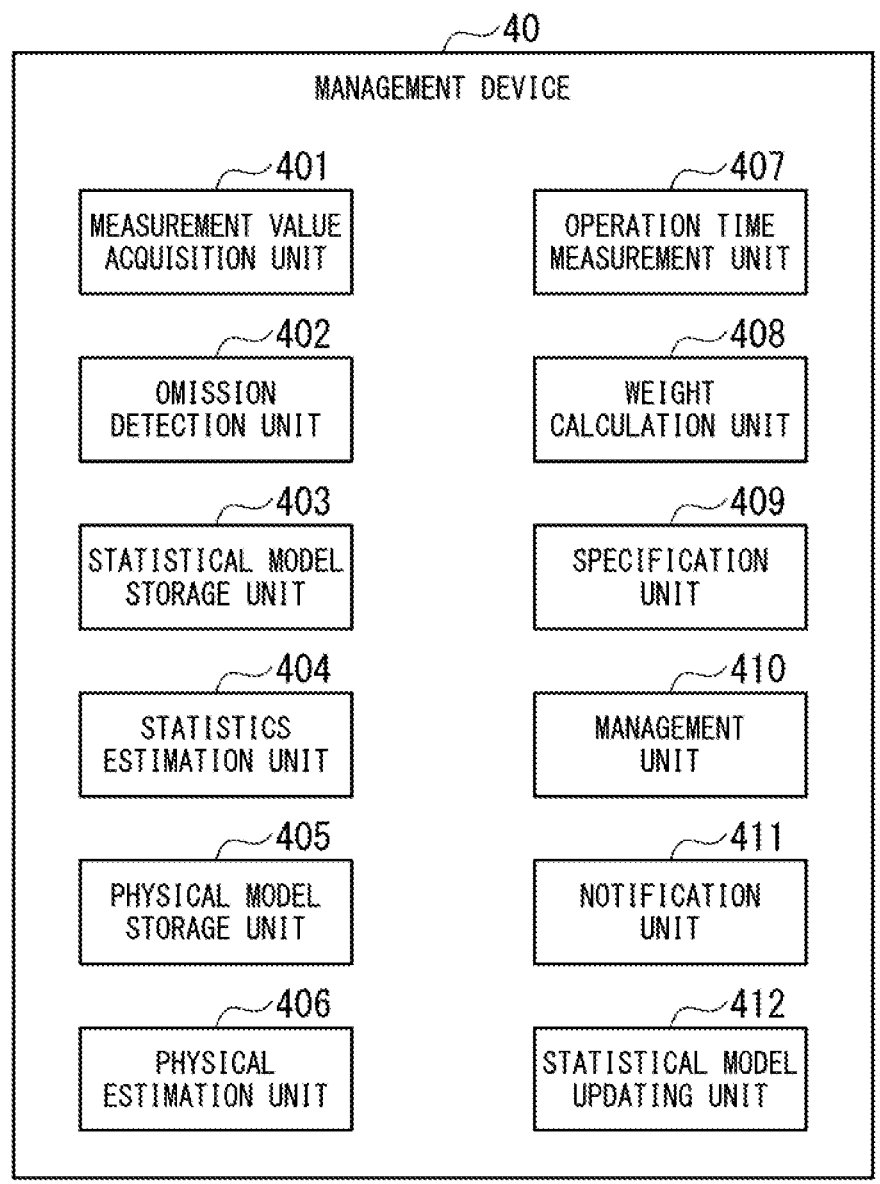
FIG. 2 is a schematic block diagram showing a configuration of a management device according to the first embodiment.

The management device 40 is configured to manage the target device 10 based on the measurement value received from the communication device 30. The management device 40 is an example of an information processing device.
<Configuration of Management Device>
FIG. 2 is a schematic block diagram showing a configuration of the management device according to the first embodiment.

The management device 40 includes a measurement value acquisition unit 401, an omission detection unit 402, a statistical model storage unit 403, a statistics estimation unit 404, a physical model storage unit 405, a physical estimation unit 406, an operation time measurement unit 407, a weight calculation unit 408, a specification unit 409, a management unit 410, a notification unit 411, and a statistical model updating unit 412.

The measurement value acquisition unit 401 is configured to receive measurement values of state quantities measured by a plurality of measurement instruments 20 from the communication device 30.

The omission detection unit 402 is configured to detect a state quantity of which the value is omitted among state quantities to be processed, based on the plurality of measurement values acquired by the measurement value acquisition unit 401. Here, the omission of a value refers to temporal or spatial omission. For example, in a case where the management unit 410 manages a state quantity for each time $\Delta t$, the omission detection unit 402 detects the omission of a measurement value at time $T+\Delta t$ when a measurement value at time $T$ and a measurement value at time $T+2\Delta t$ are acquired. Further, for example, in a case where the management unit 410 manages a state quantity for each distance $\Delta d$, the omission of measurement values at a position $(0, \Delta d)$, a position $(\Delta d, 0)$, a position $(\Delta d, \Delta d)$, a position $(\Delta d, 2\Delta d)$, and a position $(2\Delta d, \Delta d)$ is detected when measurement values at a position $(0, 0)$, a position $(2\Delta d, 0)$, a position $(0, 2\Delta d)$, and a position $(2\Delta d, 2\Delta d)$ are acquired.

The statistical model storage unit 403 is configured to store a statistical model to be used to execute estimation by the statistics estimation unit 404. The statistical model is a model that statistically reproduces the movement of the target device 10 based on values of a state quantity in the past operation of the target device 10. Measurement values acquired by the measurement value acquisition unit 401 and values specified by the specification unit 409 are stored in the statistical model storage unit 403. The statistical model is updated based on the stored values. The accuracy of the statistical model is improved in association with the storage of values of state quantities. Examples of the statistical model include a multiple regression model, a classification tree model, a neural network model, an autoregression model, and the like.

The statistics estimation unit 404 is configured to estimate a value of a state quantity by applying a measurement value acquired by the measurement value acquisition unit 401 to a statistical model stored in the statistical model storage unit 403. Hereinafter, a value of a state quantity estimated by the statistics estimation unit 404 will be referred to as a statistical estimation value.

The physical model storage unit 405 is configured to store a physical model to be used to execute estimation by the physical estimation unit 406. The physical model is a model which is constructed based on design data of the target device 10 and reproduces the movement of the target device 10 using a numerical expression (for example, a thermodynamic equation) that follows the laws of nature. The accuracy of an estimation value obtained by the physical model generally decreases as the target device 10 deteriorates with time. The degree of deterioration with time is an example of an application condition of a physical model.

The physical estimation unit 406 estimates a value of a state quantity by applying a measurement value acquired by the measurement value acquisition unit 401 to a physical model stored in the physical model storage unit 405. Hereinafter, a value of a state quantity estimated by the physical estimation unit 406 will be referred to as a physical estimation value.

The operation time measurement unit 407 is configured to monitor a measurement value acquired by the measurement value acquisition unit 401 and measure an operation time of the target device 10. The operation time may be measured using an equivalent operation time or may be measured in real time.

The weight calculation unit 408 calculates weight coefficients of a statistical estimation value and a physical estimation value based on an amount changing according to deterioration of the target device 10 with time. Examples of the amount changing according to deterioration of the target device 10 with time include an operable time, the remaining life span, the efficiency of a compressor, the temperature of exhaust gas of the target device 10, and the like. Meanwhile, in the first embodiment, the weight calculation unit 408 is configured to calculate a weight coefficient based on an operation time measured by the operation time measurement unit 407. The weight calculation unit 408 increases a weight coefficient of a statistical estimation value and decreases a weight coefficient of a physical estimation value as an operation time becomes longer (as deterioration with time progresses further). That is, the weight coefficient of the statistical estimation value monotonously increases with respect to the degree of deterioration with time, and the weight coefficient of the physical estimation value monotonously decreases with respect to the degree of deterioration with time.

The specification unit 409 is configured to specify a value of a state quantity of which the omission has been detected by the omission detection unit 402, based on a statistical estimation value and a physical estimation value related to the state quantity. Specifically, the specification unit 409 is configured to obtain a weighted average value of the statistical estimation value and the physical estimation value based on a weight coefficient calculated by the weight calculation unit 408 and specify the obtained weighted average value as a value of a state quantity of which the omission is detected by the omission detection unit 402.

The management unit 410 is configured to manage the target device 10 based on a measurement value acquired by the measurement value acquisition unit 401 and a value specified by the specification unit 409. Examples of the management of the target device 10 include monitoring regarding whether a state quantity of the target device 10 deviates from an operation allowable range, monitoring regarding whether an output of the target device 10 satisfies a target, output of a control signal to the target device 10, and the like.

The notification unit 411 is configured to issue a notification to an administrator in a case where a physical estimation value and a statistical estimation value deviate from each other by a predetermined value or more. The deviation of the physical estimation value and the statistical estimation value from each other indicates that a value stored in the statistical model storage unit 403 has deviated from a value obtained from design information. That is, the notification unit 411 can notify the administrator of deterioration of the target device 10 or an abnormality of a statistical model due to storage of abnormal measurement values.

The statistical model updating unit 412 is configured to update a statistical model based on a value stored in the statistical model storage unit 403.

<Operation of Management Device>

Figure 3:
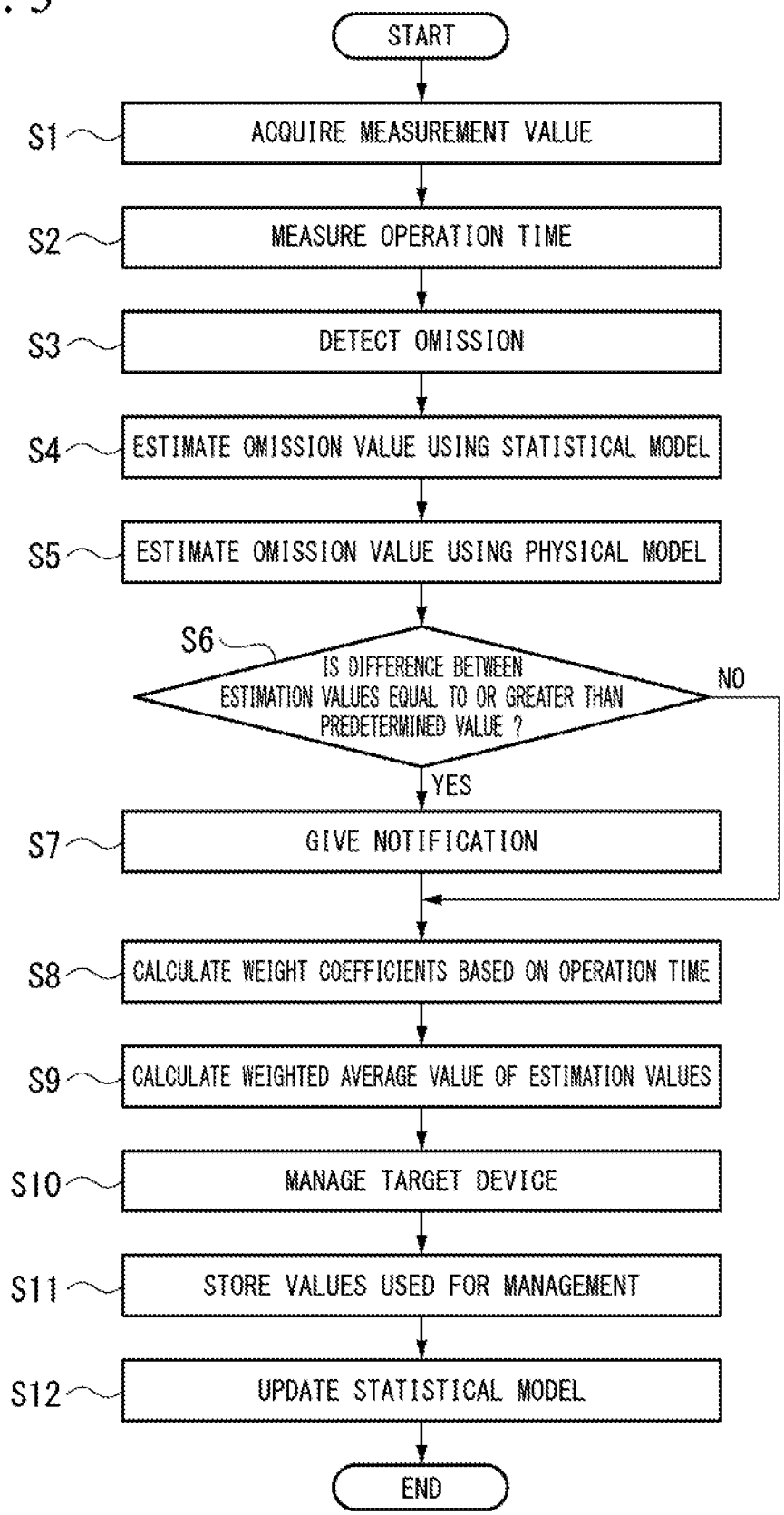
FIG. 3 is a flowchart showing operations of the management device according to the first embodiment.

FIG. 3 is a flowchart showing operations of the management device according to the first embodiment.

When the management device 40 starts to manage the target device 10, the measurement value acquisition unit 401 acquires a measurement value of a state quantity measured by the measurement instrument 20 from the communication device 30 (step S1). In addition, the operation time measurement unit 407 measures an operation time of the target device 10 based on a measurement value acquired by the measurement value acquisition unit 401 (step S2).

Next, the omission detection unit 402 detects the omission of a measurement value acquired by the measurement value acquisition unit 401 (step S3). The statistics estimation unit 404 applies the measurement value acquired by the measurement value acquisition unit 401 to a statistical model to estimate a value of a state quantity of which the omission has been detected (step S4). In addition, the physical estimation unit 406 applies the measurement value acquired by the measurement value acquisition unit 401 to a physical model to estimate a value of a state quantity of which the omission has been detected (step S5).

Next, the notification unit 411 determines whether or not a difference between the statistical estimation value estimated by the statistics estimation unit 404 and the physical estimation value estimated by the physical estimation unit 406 is equal to or greater than a predetermined value (step S6). In a case where the difference between the statistical estimation value and the physical estimation value is equal to or greater than the predetermined value (step S6: YES), the notification unit 411 notifies the administrator that an abnormality has occurred in the target device 10 or the statistical model (step S7).

In a case where the difference between the statistical estimation value and the physical estimation value is less than the predetermined value (step S6: NO) or the notification unit 411 issues a notification to the administrator, the weight calculation unit 408 calculates weight coefficients of the statistical estimation value and the physical estimation value based on the operation time measured by the operation time measurement unit 407 (step S8). Next, the specification unit 409 specifies a value of a physical quantity of which the omission has been detected by calculating a weighted average value of the statistical estimation value and the physical estimation value by using the weight coefficients calculated by the weight calculation unit 408 (step S9). In addition, the management unit 410 manages the target device 10 based on the measurement value acquired by the measurement value acquisition unit 401 and the value specified by the specification unit 409 (step S10). In a case where the target device 10 is a gas turbine, the target device 10 is managed based on a specified management value, for example, by changing a gas turbine output instruction value, changing the setting of an opening of an IGV, or changing a fuel flow rate.

In addition, the measurement value acquisition unit 401 and the specification unit 409 store values used to manage the target device 10 in the statistical model storage unit 403 (step S11). In addition, the statistical model updating unit 412 updates a statistical model based on the values stored in the statistical model storage unit 403 (step S12). Thereby, the statistics estimation unit 404 can estimate a value of a state quantity by using the statistical model updated at a timing of the next management.

<Functions and Effects>

In this manner, according to the first embodiment, the management device 40 specifies a value to be used to manage the target device 10 from a statistical estimation value and a physical estimation value based on deterioration of the target device 10 with time. Thereby, it is possible to appropriately specify a value of a state quantity to be used to manage the target device 10.

Meanwhile, it is known that deterioration with time progresses further as an operation time of the target device 10 becomes longer. Therefore, as in the first embodiment, the management device 40 can appropriately specify a value of a state quantity to be used to manage the target device 10 in accordance with deterioration with time by specifying a value to be used to manage the target device 10 based on the operation time of the target device 10. On the other hand, other embodiments are not limited thereto, and a value to be used to manage the target device 10 may be specified using other amounts changing depending on deterioration with time such as the efficiency of a compressor and the temperature of exhaust gas.

In addition, according to the first embodiment, the management device 40 obtains a weighted average value of a statistical estimation value and a physical estimation value using weight coefficients according to deterioration with time and sets the obtained weighted average value as a value of a state quantity to be used to manage the target device 10. Thereby, the statistical estimation value and the physical estimation value are not suddenly switched, and the management device 40 can manage the target device 10 by using a value of a seamless state quantity. On the other hand, in other embodiments, the management device 40 may determine any one of the statistical estimation value and the physical estimation value to be used to manage the target device 10 in accordance with deterioration with time. This is equivalent to setting one of the weight coefficient of the statistical estimation value and the weight coefficient of the physical estimation value to 1 and setting the other to 0.

In addition, according to the first embodiment, the management device 40 issues a notification in a case where a difference between a statistical estimation value and a physical estimation value is equal to or greater than a predetermined value. Thereby, when an abnormality of a statistical model due to deterioration of the target device 10 or storage of an abnormal measurement value occurs, the management device 40 can notify the administrator of the occurrence of the abnormality. On the other hand, the management device 40 according to another embodiment may not issue a notification based on a difference between a statistical estimation value and a physical estimation value.

In addition, according to the first embodiment, the statistics estimation unit 404 can estimate a value of a state quantity by using a statistical model updated at a timing of the previous management at each management timing. That is, according to the first embodiment, it is possible to estimate a statistical estimation value with higher accuracy by updating not only statistical data but also a statistical model at each management timing.

Meanwhile, the management device 40 according to the first embodiment updates a statistical model based on values of the past state quantities, but is not limited thereto. For example, in other embodiments, the management device 40 may not update a statistical model while storing state quantities in the statistical model storage unit 403. Also in this case, the accuracy of estimation using a statistical model may be improved by storing the values of the past state quantities. For example, it can be expected that an estimation accuracy would be improved by data-accumulation which makes an estimation value of an average value approach a true value according to the "Law of Large Numbers" or narrowing the distribution range thereof.

Second Embodiment

The management device 40 according to the first embodiment is configured to specify a value to be used to manage the target device 10 based on an operation time of the target device 10. On the other hand, a management device 40 according to a second embodiment is configured to specify a value to be used to manage a target device 10 based on a total number (amount) of values of state quantities related to the past operation of the target device 10 which are stored in a statistical model storage unit 403.

That is, a weight calculation unit 408 according to the second embodiment is configured to calculate a large weight coefficient of a statistical estimation value and calculate a small weight coefficient of a physical estimation value as a total number of values stored in the statistical model storage unit 403 increases. For example, the weight calculation unit 408 can calculate a weight coefficient of a statistical estimation value by substituting the total number of values stored in the statistical model storage unit 403 in an arc tangent function. Alternatively, the weight calculation unit 408 may calculate a weight coefficient of a statistical estimation value based on a function that monotonously increases to the total number of values stored in the statistical model storage unit 403 (here, a value range is equal to or greater than 0 and equal to or less than 1) in a case where the total number of values stored in the statistical model storage unit 403 is less than a predetermined value, and may set a weight coefficient of a statistical estimation value to 1 in a case where the total number of values stored in the statistical model storage unit 403 is equal to or greater than the predetermined value.

Figure 4:
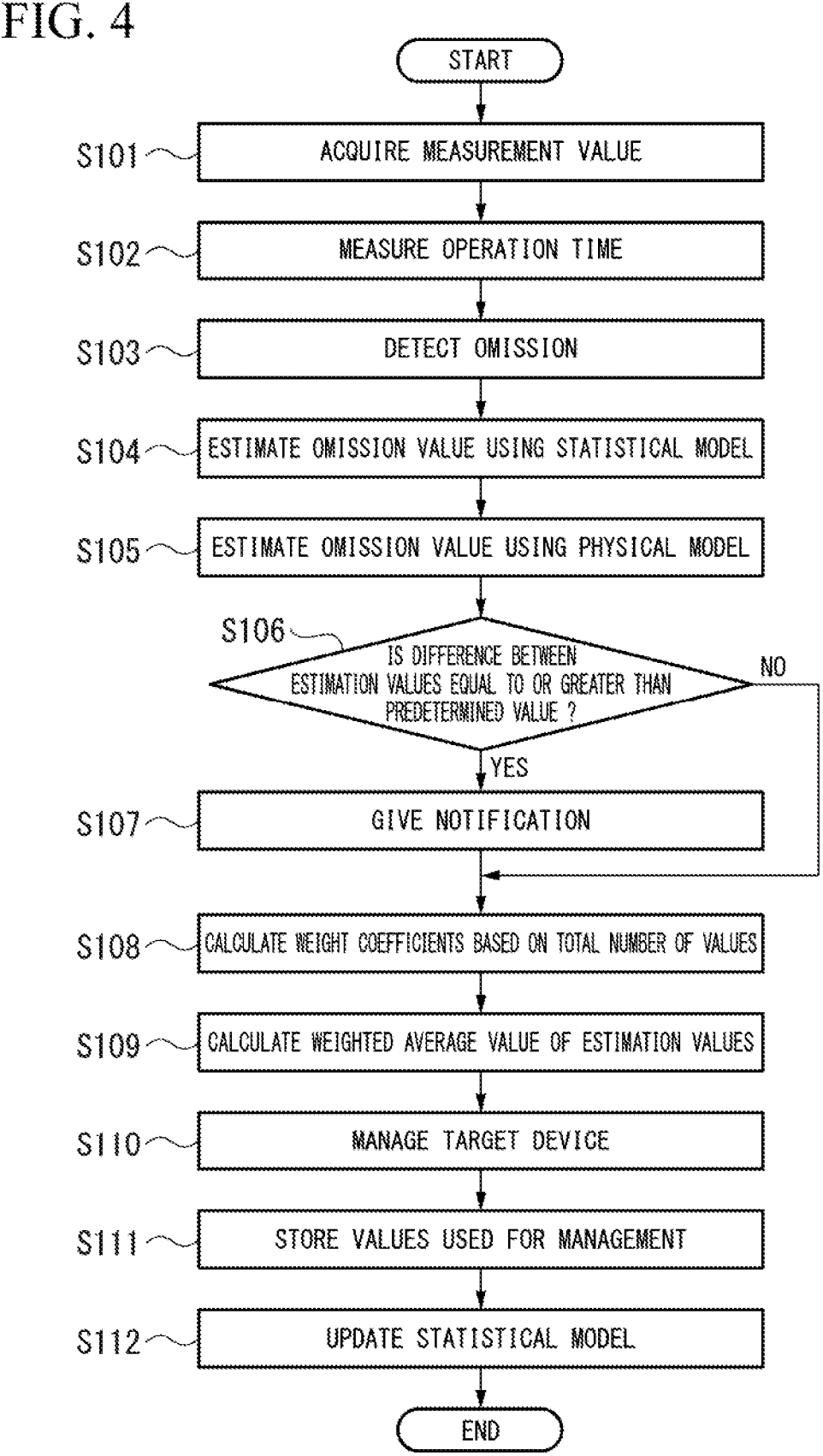
FIG. 4 is a flowchart showing operations of a management device according to a second embodiment.

FIG. 4 is a flowchart showing operations of the management device according to the second embodiment.

When the management device 40 starts to manage the target device 10, the measurement value acquisition unit 401 acquires a measurement value of a state quantity measured by the measurement instrument 20 from the communication device 30 (step S101). In addition, an operation time measurement unit 407 measures an operation time of the target device 10 based on a measurement value acquired by the measurement value acquisition unit 401 (step S102).

Next, an omission detection unit 402 detects the omission of the measurement value acquired by the measurement value acquisition unit 401 (step S103). A statistics estimation unit 404 applies the measurement value acquired by the measurement value acquisition unit 401 to a statistical model to estimate a value of a state quantity of which the omission is detected (step S104). In addition, a physical estimation unit 406 applies the measurement value acquired by the measurement value acquisition unit 401 to a physical model to estimate a value of a state quantity of which the omission is detected (step S105).

Next, a notification unit 411 determines whether or not a difference between a statistical estimation value estimated by the statistics estimation unit 404 and a physical estimation value estimated by the physical estimation unit 406 is equal to or greater than a predetermined value (step S106). In a case where the difference between the statistical estimation value and the physical estimation value is equal to or greater than the predetermined value (step S106: YES), the notification unit 411 notifies an administrator that an abnormality has occurred in the target device 10 or the statistical model (step S107).

In a case where the difference between the statistical estimation value and the physical estimation value is less than the predetermined value (step S106: NO) or the notification unit 411 issues a notification to the administrator, the weight calculation unit 408 calculates weight coefficients of the statistical estimation value and the physical estimation value based on the total number of values stored in the statistical model storage unit 403 (step S108). Next, the specification unit 409 specifies a value of a physical quantity of which the omission is detected by calculating a weighted average value of the statistical estimation value and the physical estimation value by using the weight coefficients calculated by the weight calculation unit 408 (step S109). In addition, the management unit 410 manages the target device 10 based on the measurement value acquired by the measurement value acquisition unit 401 and the value specified by the specification unit 409 (step S110). In addition, the measurement value acquisition unit 401 and the specification unit 409 stores values used to manage the target device 10 in the statistical model storage unit 403 (step S111). In addition, the statistical model updating unit 412 updates a statistical model based on the values stored in the statistical model storage unit 403 (step S112).

As described above, a total number of values stored in the statistical model storage unit 403, that is, the amount of values of the past state quantities increases as an operation time of the target device 10 becomes longer. That is, the total number of values stored in the statistical model storage unit 403 is a value that changes depending on deterioration with time. Therefore, the management device 40 according to the second embodiment can appropriately specify a value of a state quantity to be used to manage the target device 10 in accordance with deterioration with time by specifying a value to be used to manage the target device 10 based on the amount of values of the past state quantities.

Meanwhile, according to the second embodiment, the management device 40 obtains a weighted average value of a statistical estimation value and a physical estimation value by using weight coefficients corresponding to the total number of values stored in the statistical model storage unit 403 and sets the obtained weighted average value to be a value of a state quantity to be used to manage the target device 10, but is not limited thereto. For example, in other embodiments, the management device 40 may determine any one of the statistical estimation value and the physical estimation value to be used to manage the target device 10 in accordance with the total number of values stored in the statistical model storage unit 403.

Other Embodiments

Although an embodiment has been described above in detail with reference to the accompanying drawing, a specific configuration is not limited to the above-described configurations, and various modification can be made.

For example, the management device 40 in the management system 1 according to the above-described embodiment has a function of extracting and specifying a value to be used to manage the target device 10, but is not limited thereto. For example, in the management systems 1 according to the other embodiments, an information processing device configured to extract and specify a value to be used to manage the target device 10 may be provided separately from the management device 40, and the management device 40 may be configured to manage the target device 10 using the value specified by the information processing device.

In addition, for example, the management device 40 according to the above-described embodiment acquires a measurement value through the network N, but is not limited thereto. For example, the management devices according to the other embodiments may directly acquire a measurement value from the measurement instrument 20. In this case, the management system 1 may not include the communication device 30.

In addition, according to the above-described embodiments, the management device 40 obtains a value of which the omission is detected through estimation, but is not limited thereto. For example, in other embodiments, the management device 40 may obtain a value of a state quantity through estimation regardless of the presence or absence of omission and may specify a value to be used to manage the target device 10 by using a weighted average of a measurement value and an estimation value or selecting either of them.

In addition, according to the above-described embodiments, the management device 40 obtains a weighted average of one statistical estimation value and one physical estimation value or selects either of them, but is not limited thereto. For example, in other embodiments, the management device 40 may generate a plurality of statistical estimation values related to one state quantity from a plurality of statistical models or may generate a plurality of physical estimation values related to one state quantity from a plurality of physical models. In this case, the management device 40 specifies a value to be used to manage the target device 10 among a plurality of statistical estimation values and a plurality of physical estimation values in accordance with deterioration of the target device 10 with time.

Further, in other embodiments, the management device 40 may specify a value to be used to manage the target device 10 based on application conditions of a physical model. For example, in a case where the physical model is a model having application conditions that the outside air temperature is X degrees Celsius and having a load of approximately 100%, a value to be used to manage the target device 10 may be specified by using a weighted average of weights based on the degree of similarity between the actual environment and the application conditions or by selecting either of them.

In addition, according to the above-described embodiments, in the management device 40, the measurement value acquisition unit 401 and the specification unit 409 store values used to manage the target device 10 in the statistical model storage unit 403, but is not limited thereto. For example, in other embodiments, the values may be stored in an external database of the management device 40.

Figure 5:
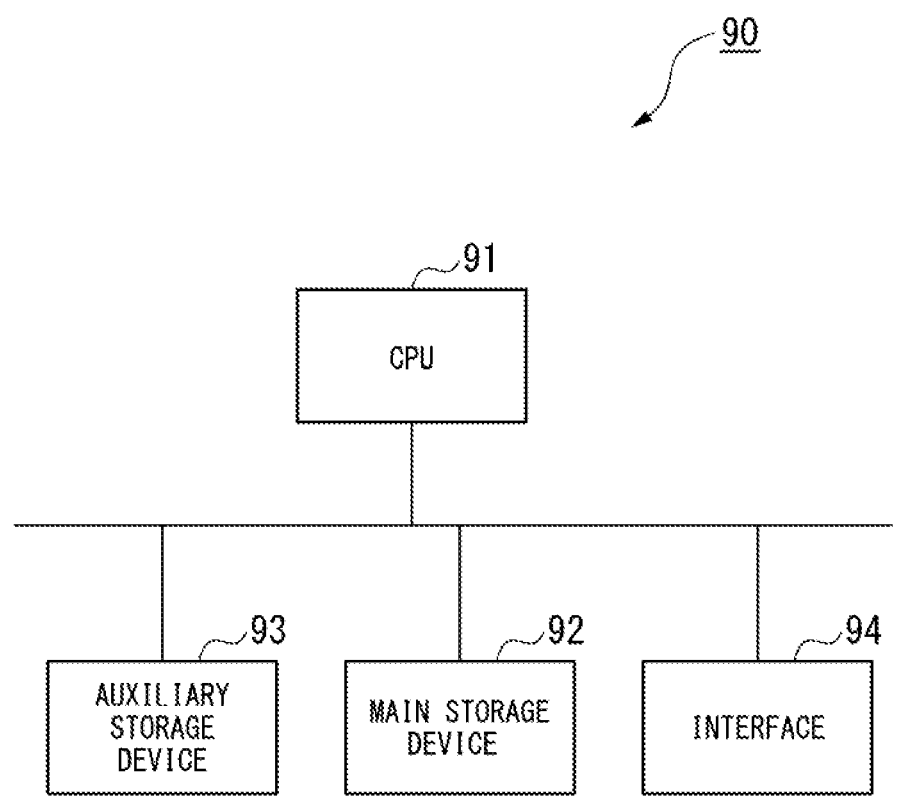
FIG. 5 is a schematic block diagram showing a configuration of a computer according to at least one embodiment.

FIG. 5 is a schematic block diagram showing a configuration of a computer according to at least one embodiment.

A computer 90 includes a CPU 91, a main storage device 92, an auxiliary storage device 93, and an interface 94.

The management device 40 mentioned above is mounted on the computer 90. In addition, operations of the above-described processing units are stored in the auxiliary storage device 93 in a format of a program. The CPU 91 reads out a program from the auxiliary storage device 93, develops the program in the main storage device 92, and executes the above-described processing in accordance with the program. In addition, the CPU 91 secures a storage area corresponding to the above-described statistical model storage unit 403 and physical model storage unit 405 in the main storage device 92 in accordance with a program.

Examples of the auxiliary storage device 93 include a hard disk drive (HDD), a solid state drive (SSD), a magnetic disc, a magneto-optical disc, a compact disc read only memory (CD-ROM), a digital versatile disc read only memory (DVD-ROM), a semiconductor memory, and the like. The auxiliary storage device 93 may be an internal medium directly connected to a bus of the computer 90 or may be an external medium connected to the computer 90 through the interface 94 or a communication line. Further, in a case where the program is distributed to the computer 90 through a communication line, the computer 90 having the program distributed thereto may be developed in the main storage device 92 and may execute the above-described processing. In at least one embodiment, the auxiliary storage device 93 is a non-transitory tangible medium.

In addition, the program may be a program that realizes some of the above-described functions. Further, the program may be a so-called differential file (differential program) that realizes the above-described functions by a combination with other programs stored in the auxiliary storage device 93 in advance.

INDUSTRIAL APPLICABILITY

The information processing device according to the present invention specifies a value to be used to manage a target device from an estimation value of a statistical model and an estimation value of a physical model based on deterioration of a target device with time. Thereby, it is possible to appropriately specify a value of a state quantity to be used to manage the target device.

DESCRIPTION OF REFERENCE NUMERALS

1 Management system
10 Target device
20 Measurement instrument
30 Communication device
40 Management device (information processing device)
401 Measurement value acquisition unit
402 Omission detection unit
403 Statistical model storage unit
404 Statistics estimation unit
405 Physical model storage unit
406 Physical estimation unit
407 Operation time measurement unit
408 Weight calculation unit
409 Specification unit
410 Management unit
411 Notification unit
412 Statistical model updating unit

The invention claimed is:

1. An information processing device comprising:
a statistics estimation unit configured to estimate a value of a state quantity by using a statistical model constructed based on values of past state quantities of a target device;
a physical estimation unit configured to estimate a value of a state quantity by using a physical model constructed based on design data of the target device; and
a specification unit configured to specify a value to be used to manage the target device from the value estimated by the statistics estimation unit and the value estimated by the physical estimation unit based on an amount of values of the past state quantities used to construct the statistical model.

2. The information processing device according to claim 1, wherein the specification unit is configured to specify the value to be used to manage the target device based on predetermined application conditions of the physical model.

3. The information processing device according to claim 2, wherein the specification unit is configured to specify the value to be used to manage the target device based on an operation time of the target device which is one of the predetermined application conditions.

4. The information processing device according to claim 1, further comprising:
a notification unit configured to issue a notification in a case where a difference between the value estimated by the statistics estimation unit and the value estimated by the physical estimation unit is equal to or greater than a predetermined value.

5. The information processing device according to claim 1, further comprising:
a model updating unit configured to update a statistical model based on the values of the past state quantities used to construct the statistical model,
wherein the specification unit is configured to specify the value to be used to manage the target device by using the updated statistical model.

6. The information processing device according to claim 1, wherein the specification unit is configured to specify a weighted average value of the value estimated by the statistics estimation unit and the value estimated by the physical estimation unit using weights according to deterioration of the target device with time as the value to be used to manage the target device.

7. An information processing method comprising:
estimating a value of a state quantity by using a statistical model constructed based on values of past state quantities of a target device;
estimating a value of a state quantity by using a physical model constructed based on design data of the target device; and
specifying a value to be used to manage the target device from the value estimated using the statistical model and the value estimated using the physical model based on an amount of values of the past state quantities used to construct the statistical model.

8. A non-transitory computer readable medium comprising a program causing a computer to:
estimate a value of a state quantity by using a statistical model constructed based on values of past state quantities of a target device;
estimate a value of a state quantity by using a physical model constructed based on design data of the target device; and
specify a value to be used to manage the target device from the value estimated using the statistical model and the value estimated using the physical model based on an amount of values of the past state quantities used to construct the statistical model.

* * * * *